US009220996B2

United States Patent
Xu et al.

(10) Patent No.: US 9,220,996 B2
(45) Date of Patent: Dec. 29, 2015

(54) JET TYPE CONDENSER

(71) Applicant: DONGFANG TURBINE CO., LTD./DTC, Deyang (CN)

(72) Inventors: Mei Xu, Deyang (CN); Ye Xu, Deyang (CN); Weilong Liu, Deyang (CN); Shunke Tan, Deyang (CN)

(73) Assignee: DONGFANG TURBINE CO., LTD./DTC, Deyang, Sichuan (CN)

( * ) Notice: Subject to any disclaimer, the term of this patent is extended or adjusted under 35 U.S.C. 154(b) by 0 days.

(21) Appl. No.: 14/375,370

(22) PCT Filed: Sep. 21, 2012

(86) PCT No.: PCT/CN2012/001287
§ 371 (c)(1),
(2) Date: Jul. 29, 2014

(87) PCT Pub. No.: WO2013/044588
PCT Pub. Date: Apr. 4, 2013

(65) Prior Publication Data
US 2015/0076718 A1    Mar. 19, 2015

(30) Foreign Application Priority Data

Sep. 29, 2011  (CN) .......................... 2011 1 0292561

(51) Int. Cl.
*B01D 5/00*   (2006.01)
*F28B 3/04*   (2006.01)

(52) U.S. Cl.
CPC ............... *B01D 5/0027* (2013.01); *F28B 3/04* (2013.01)

(58) Field of Classification Search
CPC .................................................. B01D 5/0027
USPC .......................................................... 261/153
See application file for complete search history.

(56) References Cited

U.S. PATENT DOCUMENTS

2006/0032618 A1    2/2006  Yoshii

FOREIGN PATENT DOCUMENTS

| CN | 101458039 A | * | 6/2009 | ................ F28B 1/02 |
| CN | 101458039 B |   | 9/2010 |                             |

(Continued)

OTHER PUBLICATIONS

Translation of CN101458039A.*
International Search Report for Application No. PCT/CN2012/001287, dated Nov. 29, 2012.
Written Opinion for Application No. PCT/CN2012/001287, dated Nov. 29, 2012.

(Continued)

Primary Examiner — Duane Smith
Assistant Examiner — Adam W Bergfelder
(74) Attorney, Agent, or Firm — Alston & Bird LLP (57) ABSTRACT

A jet type condenser comprises a shell (8). A plurality of multilayered inner water chambers (3,4) is arranged in the shell, multilayered outer water chambers (9,10) being correspondingly in communication with the inner water chambers (3,4) are arranged outside the shell (8), each of the outer water chambers (9,10) is in communication with a water source, the lower portion of the inner water chamber (4) in a bottom layer is an air-cooling area (6), and a water guiding tube (16) in communication with the air-cooling area (6) is arranged at the bottom of the inner water chamber (4) of the bottom layer. A transverse partition board (5) is disposed in the inner water chamber (4) of the bottom layer, the inner space of the inner water chamber (4) of the bottom layer is divided into an upper cavity and a lower cavity (4-1, 4-2) which are independent, and correspondingly, the outer water chamber (10) corresponding to the inner water chamber (4) of the bottom layer is also divided into two independent cavities (10-1, 10-2) being respectively in communication with the two cavities (4-1, 4-2) of the inner water chamber (4) of the bottom layer and respectively connected with the water source. The use range of the jet type condenser is expanded, the condenser depression of condensate of the condenser can be remarkably reduced, and the running thermal consumption of a unit is reduced.

7 Claims, 4 Drawing Sheets

(56) References Cited

FOREIGN PATENT DOCUMENTS

| | | |
|---|---|---|
| CN | 102506594 A | 6/2012 |
| JP | 2006194457 A | 7/2006 |

OTHER PUBLICATIONS

International Preliminary Report on Patentability for Application No. PCT/CN2012/001287; dated Apr. 1, 2014.

\* cited by examiner

JET TYPE CONDENSER

TECHNICAL FIELD

The present invention relates to an exhaust-steam cooling system of an air-cooling unit in a heating and power plant, and in particular, to a jet type condenser provided with a structure of multilayered inner water chamber and a manner of adjustment for cooling water.

BACKGROUND ART

With rapid industrial development, there is a significant increase in industrial water consumption, which resulted in lack of water; accordingly, water coolers were gradually replaced by air coolers in refineries and petrochemical plants, and later an air-cooling system has began to be used in power plants. The air-cooling system is divided into a direct air-cooling system and an indirect air-cooling system, the later is also divided into two types, i.e., an indirect air-cooling system having a jet type condenser and an indirect air-cooling system having a surface condenser. Since there needs a heat exchange between the cooling water with steam in the pipe(s) in the surface condenser, a terminal temperature difference exists between the cooling water and condensed water. Moreover, the back pressure of the surface condenser is higher than that of the jet type condenser under the same conditions. As a result, the direct air-cooling system and the indirect air-cooling system having jet type condenser may be a trend for the air-cooling system in power stations.

Figure 1:
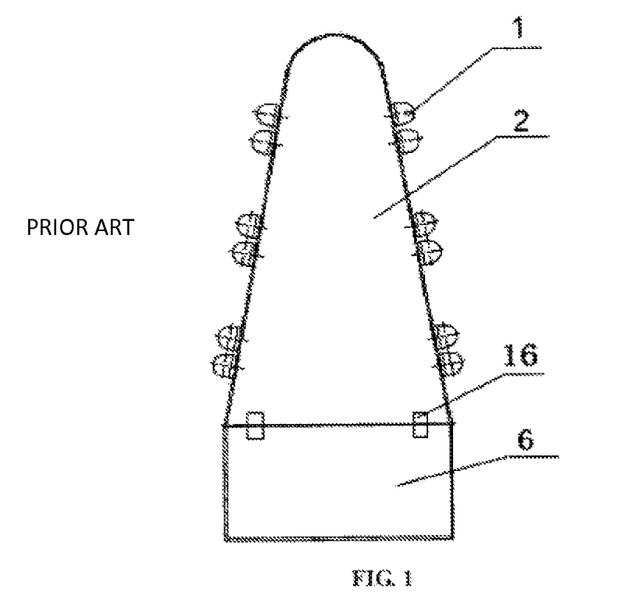
FIG. 1 is a schematically structural diagram of an inner water chamber in a traditional jet type condenser.

In 1970s and 1980s, large diameter exhaust pipes and a huge vacuum were the bottleneck in the development of the direct air-cooling system. A stand-alone capacity was limited to 200 MW. The direct air cooling system got a rapid development by the end of last century, and the stand-alone capacity was up to 686 MW. In this century a single unit with capacity of 1000 MW has been put into operation. On the other hand, the indirect air-cooling system having jet-type condenser was stayed the way it was in 1970s and 1980s. Until this year, a first set of 600 MW unit of this type was put into operation in the Second Power Plant in Baoji, China. The nozzle arrangement of jet type condenser should be one of the reasons to slow down the development of the indirect air-cooling system. FIG. 1 shows a structure of a single-layered inner water chamber in an existing jet type condenser. Multiple rows of nozzles 1 are arranged at the side of the inner water chamber 2. A water guiding tube 16 in communication with an air-cooling area 6 is provided at the bottom of the inner water chamber 2. The nozzles 1 in the jet type condenser are film nozzles 1 with a jet pressure head of 0.005-0.0225 MPa at which a stable water film can be formed. The jet type condenser in large or medium-sized units with a capacity of over 200 MW is relatively large. The height difference between the nozzle 1 at the top row and the one 1 at the bottom row is more than 800 mm, which makes the water pressure difference therebetween reaches over 0.008 MPa, even though the injection drop (pressure difference during spraying) of design conditions is at a range of 0.005-0.0225 MPa. Since the water-cooling system of the jet type condenser is designed in accordance with the design conditions, when in winter, the desired cooling water flow can be smaller than that required in the design conditions due to the lower temperature of the cooling water. However, the decrease in the amount of cooling water into the jet type condenser will make the water pressure in the inner water chamber 2 below the design conditions. In this case, if spraying film directly, the injection drop of the nozzles 1 at a few rows above may be less than 0.005 MPa, resulted in a poor film. For the jet type condenser in large-sized units, it may be a challenge to make arrangement for the nozzles 1 to reduce the cooling water flow in winter.

For example, in a jet type condenser of a single-layered water chamber in a 200 MW unit putted into operation by our company, the pressure difference of the nozzles 1 at each row is at a range of 0.005-0.0225 MPa when the cooling water flow meets the design conditions. However, under winter conditions, if the cooling water flow is about 60% of that in design conditions, the differential pressure of the nozzles 1 at a few rows above may be less than 0.005 MPa, which results in a poor film-forming effect and spray of water. The cooling water cannot be heated to the saturated temperature, which causes a larger undercooling of condensed water, thereby increasing the heat consumption of the unit.

Figure 2:
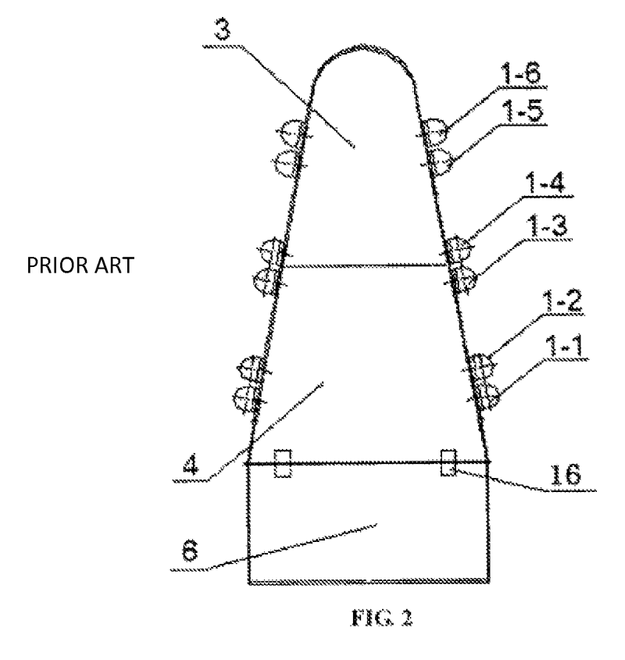
FIG. 2 is a schematically structural diagram of an inner water chamber according to an invention patent No. CN200810148144 filed by the applicant in 2008.

In order to solve the arrangement problem about the nozzle 1 in a large unit, the applicant filed an application for the patent for invention on a jet type condenser with multilayered inner water chambers (Patent No. CN200810148144) in China in 2008, which has been reviewed and approved by the State Intellectual Property Office of China and the patent was granted in the year of 2010. As shown in FIG. 2, the structure of the inner water chamber in this jet type condenser is a multilayer arrangement along the height direction, comprising an upper inner water chamber 3 and a lower inner water chamber 4, wherein the lower inner water chamber 4 is in communication with an air-cooling area 6 through a water guiding tube 16 at the bottom thereof, and two—four rows of film type nozzles 1 are provided at both sides of the upper inner water chamber 3 and the lower inner water chamber 4. Generally, three rows of nozzles 1-4, 1-5 and 1-6 are provided at the sides of the upper water chamber 3, and three rows of nozzles 1-1, 1-2 and 1-3 are provided at the sides of the lower inner water chamber 4. According to the design specification of the jet type condenser, the cooling water flow entered into the air-cooling area 6 is usually controlled by passage section of the water guiding tube 16 and the water pressure in the lower inner water chamber 4 during the design conditions. In general, the cooling water flow into the air-cooling area 6 is 5% of the total cooling water flow into the condenser under the design conditions.

Figure 3:
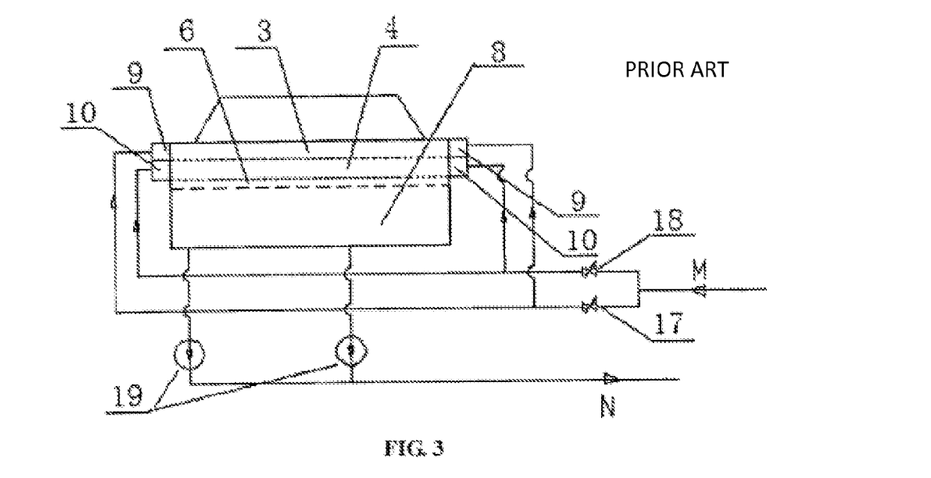
FIG. 3 is a schematically structural diagram of a cooling water system according to an invention patent No. CN200810148144 filed by the applicant in 2008.

A cooling water system of the jet type condenser in the Patent No. CN200810148144 is shown in FIG. 3, wherein an upper outer water chamber 9 and a lower outer water chamber 10 are disposed outside the upper inner water chamber 3 and lower inner water chamber 4 respectively. A hot well, provided at the bottom of the shell 8 of the condenser, is in communication with a circulating water output pipeline N on which water pumps 19 are arranged. The other end of the circulating water output pipeline N is in communication with a cooling tower. Through the water pumps 19, some circulating water collected in the condenser shell may be pumped into the cooling tower for cooling. At the same time, the cooling water is delivered by the cooling tower to the upper inner water chamber 3 and the lower inner water chamber 4 through two branch pipes of a cooling water input pipeline M. Valves 17 and 18 are provided at the two branch pipes respectively.

The jet type condenser with multilayered inner water chambers and the cooling water system thereof disclosed in the Patent No. CN200810148144 are applicable for large and medium sized air-cooling units. The condenser with this structure makes the jet pressure of the nozzles 1 at each row basically meet the requirements for jetting an optimal water film, and the film-forming effect of the nozzles 1 of the jet-type condenser having multilayered inner water chambers introduced in this patent has been greatly improved in design conditions.

However, under winter conditions, the required cooling water flow in the condenser is reduced, in this case, the valves 17 and 18 are needed to be adjusted to control the water flow entered into the upper inner water chamber 3 and the lower inner water chamber 4, thereby controlling the water pressure therein. There are two methods to ensure the film-forming effect of the nozzles 1: (1) close the valve 17 and open the valve 18, so that the cooling water can only enter into the lower inner water chamber 4 instead of the upper inner water chamber 3, thus the water pressure in the lower inner water chamber 4 can be maintained to generate a good film formed by the nozzles 1-1, 1-2 and 1-3 at both sides of the lower inner water chamber 4; (2) close the valve 18 and open the valve 17, so that the cooling water can only enter into the upper inner water chamber 3 instead of the lower inner water chamber 4, thus the water pressure in the upper inner water chamber 3 can be maintained to generate a good film formed by the nozzles 1-4, 1-5 and 1-6 at both sides of the upper inner water chamber 3. But there are shortcomings in the two methods. As to the method (1), only the lower inner water chamber 4 is used for spraying film, and the cooling water flow entering into the air-cooling area 6 depends on the passage section of the water guiding tube 16 and the water pressure in the lower inner water chamber 4. The size of the passage section of the water guiding tube 16 is designed in the case that both the upper inner water chamber 3 and the lower inner water chamber 4 are operated together under the design conditions, so that the cooling water flow entering into the air-cooling area 6 can be designed as 5% of the total cooling water flow entering into the condenser. But, only the lower inner water chamber 4 is used in winter, as the passage section of the water conduit 16 is settled, the cooling water flow entering into the air-cooling area 6 may be far greater than 5% of the total cooling water flow entering into the condenser when the water pressure in the lower inner water chamber 4 meets the requirement for the film forming effect of the nozzles 1. In this case, a large amount of cooling water enters into the air-cooling area 6; it's clearly that such cooling water can't be fully heated to a saturated water, thus affecting the performance of the condenser. As to the method (2), only the upper inner water chamber 3 is used for spraying film. In this case, no cooling water enters into the lower inner water chamber 4, and no cooling water enters into the air-cooling area 6, so the steam in the air-cooling area 6 can't obtain a further condensation, which increases the load of the air extracting pump and leads to rising the pressure of the condenser, thus affecting the performance of the turbine. Accordingly, the way to adjust the cooling water system is to keep the valves 17 and 18 to be normally opened, and the pressure in the upper inner water chamber 3 and the lower inner water chamber 4 can be controlled by adjusting the valves 17 and 18. Since the total water flow reduces, the pressure in the upper inner water chamber 3 and the lower inner water chamber 4 is below the design conditions, the film-forming effect of the nozzles at each water chamber gets worse, even the film can't be formed. Thus, the pressure of the upper inner water chamber 3 and the lower inner water chamber 4 can't be improved by such adjustment to guarantee a condensation effect in the condenser under winter conditions, despite of the superficial design of the multilayered inner water chamber.

SUMMARY OF THE INVENTION

An object of the present invention is to provide a jet type condenser with multilayered inner water chambers, which ensures that under all operation conditions the pressure of each water chamber is within a range of differential pressure at which an optimal film is formed by a nozzle, so that the cooling water can be heated to saturation temperature to guarantee the performance of the condenser.

A technical solution according to the present invention is:

A jet type condenser comprises a shell, a plurality of multilayered inner water chambers being arranged in the shell, multilayered outer water chambers being correspondingly in communication with the inner water chambers and being arranged outside the shell, each of the outer water chambers being in communication with a water source, the lower portion of the inner water chamber in a bottom layer being an air-cooling area, and a water guiding tube in communication with the air-cooling area being arranged at the bottom of the inner water chamber of the bottom layer, wherein a transverse partition board is disposed in the inner water chamber of the bottom layer, the inner space of the inner water chamber of the bottom layer is divided into an upper cavity and a lower cavity which are independent, and correspondingly the outer water chamber corresponding to the inner water chamber of the bottom layer is also divided into two independent cavities being in communication with the two cavities of the inner water chamber of the bottom layer and respectively connected with the water source.

A valve is provided on a pipe connecting each of the outer water chambers with the water source.

Except the lower cavity of the inner water chamber of the bottom layer, each of the inner water chambers and the upper cavity of the inner water chamber of bottom layer are provided with cooling water nozzles at both sides thereof.

The cooling water system of the jet type condenser comprises a cooling water tower, power equipment and a jet type condenser connected in sequence through pipelines, the pipelines entered the jet type condenser are divided into several parallel branches to connect the outer water chambers at all layers respectively.

The power equipment comprises a water circulating pump and a hydraulic turbine, the water circulating pump is provided on the pipeline between the jet type condenser and the cooling water tower for delivering circulating water to the cooling water tower, the hydraulic turbine is provided on the pipeline between the water cooling tower and the jet type condenser for doing work to generate energy through the flowing cooling water and supplying the energy to the water circulating pump.

Some valves are closed and the rest of valves are adjusted to enable the hydraulic pressure in each inner water chamber to meet the pressure requirement for the spraying film of the nozzle when the cooling water is below the design conditions.

The valve at the pipeline connecting the lower cavity of the outer water chamber of the bottom layer to the water source is normally opened, by adjusting the opening of the valve, so that the cooling water entering into the lower cavity of the outer water chamber of the bottom layer is controlled to be 5% of the total cooling water entering into the jet type condenser.

An advantage of the invention is:

The present invention improves the jet-type condenser having multilayered inner water chambers disclosed in the Chinese patent No. CN200810148144. The improved jet type condenser expands the use thereof to make it suitable for all large, medium or small sized steam turbine, so that the jet pressure head of nozzles at each row is within an optimum range when running under the design conditions. Most of all, under the working conditions in different seasons, the number of the nozzles for spraying water can be reduced with the decreased cooling water flow, so that when there is less cooling water flow, the jet pressure head of the nozzles at each row can still be kept within an optimum range, and the cooling water flow in the air-cooling area is 5% of the total cooling water entered into the jet type condenser, thus ensuring the performance of the condenser.

Therefore, the jet type condenser according to the present invention can remarkably reduce the condenser depression of condensate of the condenser, and the running thermal consumption of a unit. The simple and practicable jet type condenser and the cooling water system thereof are easy to be scaled up to wide use.

Numerals in the drawings mean: 1—nozzle, 2—inner water chamber, 3—upper inner water chamber, 4—lower inner water chamber, 4-1 upper cavity of the lower inner water chamber, 4-2 lower cavity of the lower inner water chamber, 5—partition board, 6—air-cooling area, 7—extraction channel, 8—shell of the condenser, 9—upper outer water chamber, 10—lower outer water chamber, 10-1—upper cavity of the lower outer water chamber, 10-2—lower cavity of the lower outer water chamber, 11—stop valve, 12—control valve, 13—control valve, 14—water turbine, 15—circulating water pump, 16—water guiding tube, 17—valve, 18—valve, 19—water pump, M—cooling water inlet pipeline, N—circulating water outlet pipeline, X—water inlet pipeline of the upper outer water chamber, Y—water inlet pipeline of the upper cavity of the lower inner water chamber, and Z—water inlet pipeline of the lower cavity of the lower inner water chamber.

DETAILED DESCRIPTION

As shown in FIGS. 4-7, the difference of the jet-type condenser according to the present invention and the jet type condenser with multilayered inner water chambers disclosed in the patent No. CN CN200810148144 is that, the lower inner water chamber 4 in the present invention is divided transversely into an upper cavity 4-1 of the lower inner water chamber and a lower cavity 4-2 of the lower inner water chamber through a partition board 5, and the cooling water is introduced into the air-cooling area 6 from the bottom of the lower cavity 4-2 of the lower inner water chamber through a water guiding tube 16. Cooling water nozzles 1 are provided at two sides of the upper inner water chamber 3 and the upper cavity 4-1 of the lower inner water chamber, but there is no nozzle 1 at a side of the lower cavity 4-2 of the lower inner water chamber. Functionally, the upper inner water chamber 3 and the upper cavity 4-1 of the lower inner water chamber are inner water chambers for spraying, and the lower cavity 4-2 of the lower inner water chamber is an inner water chamber in the air-cooling area. Therefore, the cooling water entered into the air-cooling area 6 is separated from that in the main condensing area. It should be noticed that in the jet type condenser having multilayered inner water chambers disclosed in the Patent No. CN200810148144, the bottom of the lower inner water chamber 4 is in communication with the air-cooling area 6 without separation. Taking a three-layered inner water chamber 2 as an example, the present invention describes the structure of the jet type condenser with multilayered inner water chambers in detail.

Figure 4:
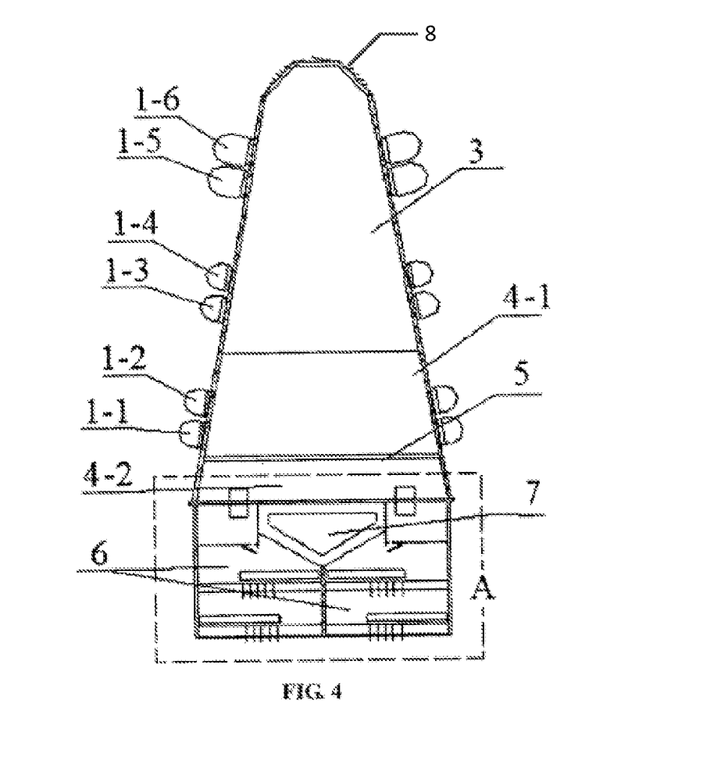
FIG. 4 is a schematically structural diagram of an inner water chamber in a jet type condenser having multilayered inner water chambers according to the present invention.

As shown in FIG. 4, the jet type condenser according to the present invention comprises a shell, and two layers of inner water chambers 2 including the upper inner water chamber 3 and the lower inner water chamber 4 arranged in the shell along the height direction. An upper outer water chamber 9 and a lower outer water chamber 10, correspondingly in communication with the upper inner water chamber 3 and the lower inner water chamber 4, are arranged outside the shell and connected with a water source respectively. A transverse partition board 5 is disposed in the lower inner water chamber 4 to divide the inner space of the lower inner water chamber 4 into two independent cavities, i.e. the upper cavity 4-1 and the lower cavity 4-2. Correspondingly, the lower outer water chamber 10 is also divided into two independent cavities, i.e. an upper cavity 10-1 and a lower cavity 10-2. Furthermore, the upper cavity 10-1 of the lower outer water chamber and the lower cavity 10-2 of the lower outer water chamber, respectively in communication with the upper cavity 4-1 of the lower inner water chamber and the lower cavity 4-2 of the lower inner water chamber, are also connected with the water source respectively. A water outlet, i.e. the water guiding tube 16, arranged at the bottom of the lower cavity 4-2 of the lower inner water chamber, is in communication with the air-cooling area 6 and directly introduces the cooling water delivered into the lower cavity 4-2 of the lower inner water chamber into the air-cooling area 6.

The upper inner water chamber 3 and the upper cavity 4-1 of the lower inner water chamber are provided with cooling water nozzles 1 at both sides thereof respectively. The cooling water sprayed out from the nozzles 1 contacts and exchanges heat with the high-temperature steam exhausted from a low-pressure cylinder of the turbine in the shell 8 of the jet type condenser, so that the steam is condensed and the cooling water is heated into a saturated water. The nozzles 1 are of film type. To ensure that the jet pressure of the nozzles 1 is relatively balanced, the nozzles 1 are arranged asymmetrically at the sides of the upper inner water chamber 3 and the upper cavity 4-1 of the lower inner water chamber. Four rows of nozzles 1 are arranged at both sides of the upper inner water chamber 3 with a relatively higher water pressure, wherein the nozzles 1 on the right wall are nozzles 1-6, 1-5, 1-4 and 1-3 from top to bottom respectively. Two rows of nozzles 1 are arranged at both sides of the upper cavity 4-1 of the lower inner water chamber with relatively lower pressure, wherein the nozzles 1 on the right wall are nozzles 1-2 and 1-1 from top to bottom respectively.

The air-cooling area 6 is divided into a multilayered structure along the height direction. The outflow water from the water guiding tube enters into a guide plate of the air-cooling area 6 and then flows into a water spraying tray through a tongue-shaped plate below the guide plate. The remaining steam at the main condensing area is condensed into water again at the air-cooling area, and the remaining steam-gas mixture is discharged to the outside of the condenser through an extraction channel 7.

Figure 5:
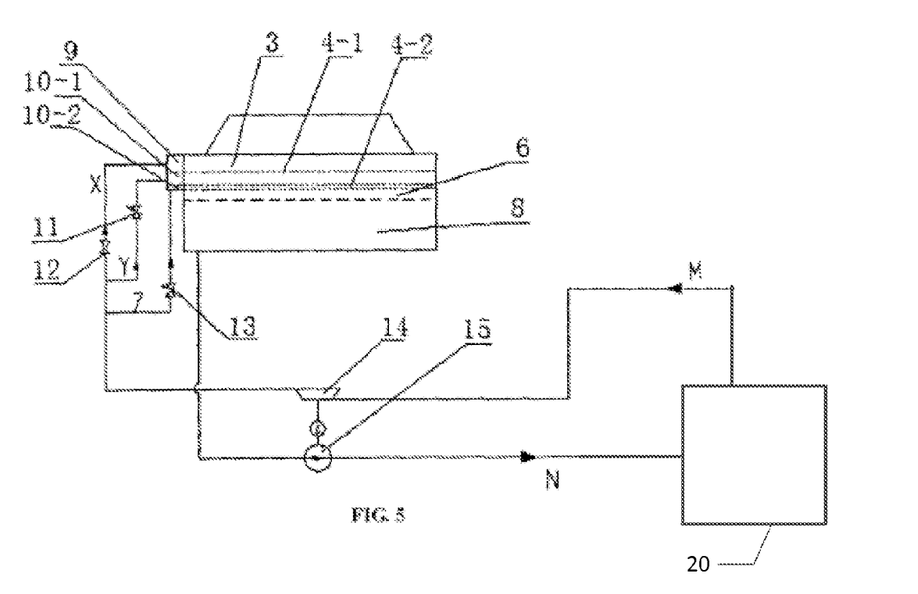
FIG. 5 is a schematic diagram of a first type of cooling water system in a jet type condenser having multilayered inner water chambers according to the present invention.
Figure 6:
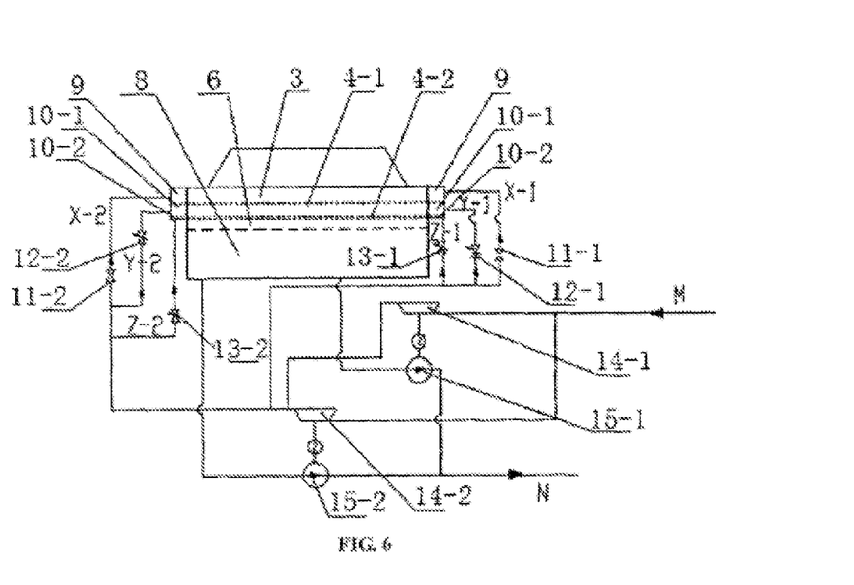
FIG. 6 is a schematic diagram of a second type of cooling water system in a jet type condenser having multilayered inner water chambers according to the present invention.
Figure 7:
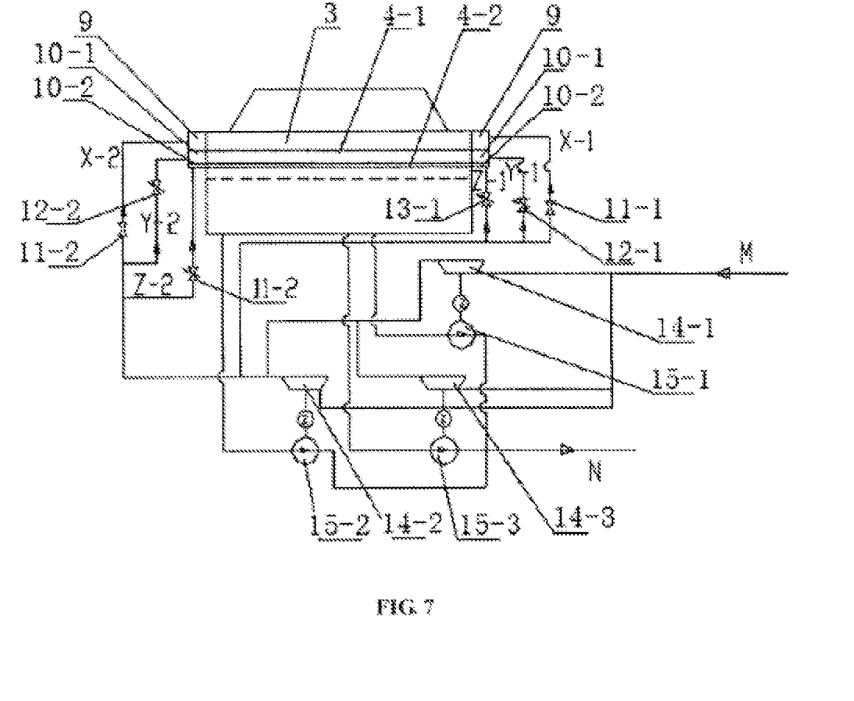
FIG. 7 is a schematic diagram of a third kind of cooling water system in a jet type condenser having multilayered inner water chambers according to the present invention.

As shown in FIGS. 5-7, the difference of the cooling water system of the jet type condenser according to the present invention and that of the jet type condenser with multilayered inner water chambers disclosed in the patent No. CN CN200810148144 is that, flow control elements are added to each water inlet pipeline, and the cooling water entering into the upper cavity 4-1 of the lower inner water chamber is separated from that into the air cooling area 6 for independent adjustment. Thus, by cutting off the water inlet pipeline in one inner water chamber when the water flow is reduced in winter, the quantity of nozzles 1 can be decreased to maintain the jet differential pressure in an optimal range, and the water flow in the air cooling area is 5% of the total cooling water entered into the jet type condenser, which assures the performance of the condenser.

The cooling water system of the jet type condenser with multilayered water chambers comprises power equipment, a cooling tower and a jet type condenser successively connected by pipelines; the pipeline between the cooling tower and the jet type condenser is a cooling water inlet pipeline M for delivering cooling water to the jet type condenser, and the pipeline between the jet type condenser and the cooling tower is a circulating water outlet pipeline N for delivering circulating water to the cooling tower.

In this embodiment, the power equipment adopts a circulating water pump 15 and a water turbine 14 to work together. The water turbine 14, arranged on the cooling water inlet pipeline M, does works by turning the blades with the height difference of the cooling water flowing through. The circulating water pump 15 is, arranged on the circulating water outlet pipeline N, is connected with the water turbine 14 for energy saving, emission reduction and environmental protection.

Most of water at the bottom of the condenser shell 8 is delivered by the circulating water pump 15 to the cooling tower through the circulating water outlet pipeline N to be cooled and reused as the cooling water of the condenser. After flowing through the water turbine 14, the cooling water inlet pipeline M is divided into three parallel branch pipes, i.e., a water inlet pipeline X of the upper outer water chamber, a water inlet pipeline Y of the upper cavity of the lower outer water chamber and a water inlet pipeline Z of the lower cavity of the lower outer water chamber, to deliver the cooling water into the upper outer water chamber 9, the upper cavity 10-1 of the lower outer water chamber and the lower cavity 10-2 of the lower outer water chamber respectively. The cooling water, entered into the upper outer water chamber 9 and the upper cavity 10-1 of the lower outer water chamber, flows into the upper inner water chamber 3 and the upper cavity 4-1 of the lower inner water chamber, enters into the condenser shell 8 by jetted through the nozzles 1, and directly contacts and exchanges heat with the exhausted steam from a low-pressure cylinder of the turbine, thus the steam is condensed. The cooling water, entered into the lower cavity 10-2 of the lower outer water chamber, flows into the lower cavity 4-2 of the lower inner water chamber, enters into the air cooling area 6 via the water guiding tube 16, and exchanges heat with the remaining steam in the air cooling area 6 to condense the steam. The circulating water is sent to the cooling tower via the outlet pipeline M. In this way, a circulating loop is formed.

The flow control elements, provided on the three branch pipes, are used for eliminating the water pressure difference of the upper inner water chamber 3, the upper cavity 4-1 of the lower inner water chamber and the lower cavity 4-2 of the lower inner water chamber in the jet type condenser with multilayered water chambers. The flow control elements may be a stop valve or a control valve. In this embodiment, the water inlet pipeline X of the upper outer water chamber is provided with a stop valve 11, the water inlet pipeline Y of the upper cavity of the lower outer water chamber is provided with a control valve 12, and the water inlet pipeline Z of the lower cavity of the lower outer water chamber is provided with a control valve 13. The flow control elements arranged on the three branch pipes are used to cooperatively adjust the flow and the pressure of cooling water entered into the upper inner water chamber 3, the upper cavity 4-1 of the lower inner water chamber and the lower cavity 4-2 of the lower inner water chamber so as to make the differential pressure of all rows of nozzles 1 to be controlled in a better pressure range for film spraying. When the cooling water flow is reduced in winter, close the flow control elements on the water inlet pipeline X of the upper outer water chamber or the water inlet pipeline Y of the upper cavity of the lower outer water chamber to make the nozzles 1 of corresponding inner water chamber stop spraying water so as to maintain the pressure of other inner water chambers, and keep the differential pressure of the nozzles 1 in an appropriate pressure range as well as the cooling water flow entered into the lower cavity 4-2 of the lower inner water chamber being 5% of the total of cooling water, thus reducing the heat transfer temperature difference and ensuring the performance of the condenser.

With regard to the present invention, according to the capacity of the steam turbine, the cooling water system of the jet type condenser with multilayered water chambers can be provided with one circulating water pump 15 and one water turbine 14, or two circulating water pumps 15 and two water turbines 14, or three circulating water pumps 15 and three water turbines 14. With regard to the adjustment method for the cooling water system of the jet type condenser according to the present invention, the water pressure of each water chamber is controlled by the water turbine 14 and the stop valve 11 or the control valves 12 and 13 arranged on the three branch pipes. The invention will be further described in detail through the following three examples.

Example 1

FIG. 5 is a schematic diagram of a first type of cooling water system for the jet type condenser with multilayered inner water chambers according to the present invention, wherein the cooling water system is provided with a set of power equipment, i.e., circulating water pump 15 and water turbine 14. Such cooling water system is generally used in a small-sized unit. The cooling water system only includes one circulating water pump 15, one water turbine 14, a cooling tower 20, a condenser as well as pipelines and flow control elements therebetween to form a circulating loop. One side of a pipeline at the rear end of the water turbine 14 is divided into three branch pipes X, Y and Z for leading to the condenser, wherein the water inlet pipeline X of an upper outer water chamber is led to the upper outer water chamber 9, the water inlet pipeline Y of an upper cavity of the lower outer water chamber is led to the upper cavity 10-1 of the lower outer water chamber, and the water inlet pipeline Z of a lower cavity of the lower outer water chamber is led to the lower cavity 10-2 of the lower outer water chamber. The three branch pipes are provided with three flow control elements respectively, that is, the water inlet pipeline X of the upper outer water chamber is provided with a stop valve 11, the water inlet pipeline Y of the upper cavity of the lower outer water chamber is provided with a control valve 12, and the water inlet pipeline Z of the lower cavity of the lower outer water chamber is provided with a control valve 13.

When the turbine runs, opens the stop valve 11, control valve 12 and control valve 13 on the three branch pipes to allow the cooling water to flow into three inner water chambers simultaneously, then opens the stop valve 11, controls the water turbine 14 to adjust the pressure of the main pipe through which the cooling water flows, adjusts the opening of the control valve 12 and control valve 13 and controls the flow and pressure of water entered into the upper cavity 10-1 of the lower outer water chamber and the lower cavity 10-2 of the lower outer water chamber to maintain the water pressure of each water chamber at a suitable range so as to ensure the film forming effect of all rows of nozzles 1. Meanwhile, controls the cooling water flow entering into the cooling zone 6 to be 5% of the total cooling water, thus realizing a better secondary condensation.

Example 2

FIG. 6 is a structural diagram of a second type of cooling water system for the jet type condenser with multilayered inner chambers according to the present invention, wherein the cooling water system is generally used in a medium-sized unit. The cooling water system is provided with two sets of power equipment, i.e., two circulating water pumps 15-1 and 15-2 connected in parallel and two water turbines 14-1 and 14-2 connected in parallel. In other words, the two water turbines 14-1 and 14-2 are connected in parallel on the cooling water inlet pipeline M to work together to control the cooling water flow and do work to generate energy; the two circulating water pumps 15-1 and 15-2 are connected in parallel on the circulating water outlet pipeline N to pump the circulating water into the cooling tower simultaneously.

In the example, the pipelines at the rear ends of the water turbines 14-1 and 14-2 are divided into six branch pipes for leading to the condenser, wherein the water inlet pipelines X-1 and X-2 of the upper outer water chamber are led to the upper outer water chamber 9, the water inlet pipelines Y-1 and Y-2 of the upper cavity of the lower outer water chamber are led to the upper cavity 10-1 of the lower outer water chamber, and the water inlet pipelines Z-1 and Z-2 of the lower cavity of the lower outer water chamber are led to the lower cavity 10-2 of the lower outer water chamber. The six branch pipes are provided with six flow control elements respectively, that is, the water inlet pipelines X-1 and X-2 of the upper outer water chamber are provided with stop valves 11-1 and 11-2, the water inlet pipelines Y-1 and Y-2 of the upper cavity of the lower outer water chamber are provided with control valves 12-1 and 12-2, and the water inlet pipelines Z-1 and Z-2 of the lower cavity of the lower outer water chamber are provided with control valves 13-1 and 13-2.

When the cooling water flow entered into pipelines of the condenser conforms to the requirements in design conditions, i.e. under working conditions of 100% circulating water flow, two sets of circulating water pumps 15 and water turbines 14 are used, i.e. two circulating water pumps 15-1 and 15-2 are started up. In this situation, opens the stop valves 11-1 and 11-2, the control valves 12-1, 12-2, 13-1 and 13-2 on the six branch pipes to allow the cooling water to flow into the three inner water chambers simultaneously, control the water turbines 14-1 and 14-2 to adjust the pressure of the main pipe of the cooling water inlet pipeline M, adjusts the opening of the control valves 12-1, 12-2, 13-1 and 13-2 to control the flow and pressure of water entered into the upper cavity 10-1 of the lower outer water chamber and the lower cavity 10-2 of the lower outer water chamber so as to keep the water pressure of each water chamber in a suitable range and assure the film forming effect of all rows of nozzles 1. Meanwhile, controls the control valves 13-1 and 13-2 to ensure that the cooling water flow entered into the air cooling zone 6 is 5% of the total amount of cooling water, thus realizing a better secondary condensation.

When the cooling water flow entered into the pipelines of the condenser is decreased and may be 60% of the circulating water flow, only one set of circulating water pump 15 and water turbine 14 is used, i.e. the circulating water pump 15-1 is started up and the circulating water pump 15-2 is shut down. In this situation, the flow and pressure of water entered into the upper outer water chamber 9, the upper cavity 10-1 of the lower outer water chamber and the lower cavity 10-2 of the lower outer water chamber are controlled by the flow control elements. Specifically, the water turbine 14-1 is adjusted to control the pressure of the main pipe of the cooling water inlet pipeline M, the control valves 12-1 and 12-2 are closed, the stop valves 11-1 and 11-2 and the control valves 13-1 and 13-2 are opened to allow all the cooling water to be jetted from nozzles 1-3, 1-4, 1-5 and 1-6 of the upper inner water chamber 3, so that the differential pressure of the nozzles 1 is kept in better conditions for water film forming. Meanwhile, the opening of the control valves 13-1 and 13-2 are controlled to make the cooling water flow entered into the air cooling zone 6 is 5% of the total amount of cooling water entering into the condenser, thus ensuring the remaining steam in the secondary condensate chamber can be cooled further.

Example 3

FIG. 7 is a structural diagram of a third type of cooling water system of the jet type condenser with multilayered inner chambers according to the present invention, wherein the cooling water system of the jet type condenser with multilayered inner chambers is usually used in a large-sized unit. The cooling water system only provides with three sets of power equipment, i.e. three circulating water pumps 15-1, 15-2 and 15-3 connected in parallel and three water turbines 14-1, 14-2 and 14-3 connected in parallel. In other words, the three water turbines 14-1, 14-2 and 14-3 are connected in parallel on the cooling water inlet pipeline M to control work together to control the cooling water flow and do work to generate energy; the three circulating water pumps 15-1, 15-2 and 15-3 are connected in parallel on the circulating water outlet pipeline N to pump the circulating water into the cooling tower simultaneously.

In this example, the design of pipelines at the rear end of the water turbines 14-1, 14-2 and 14-3 are the same as that of the example 2, and the arrangement of the flow control elements mounted thereon is also the same as that of the example 2, which will not be described again herein.

When the cooling water flow entered into the pipeline of the condenser meets the design conditions, i.e. under working condition of 100% circulating water flow, three sets of circulating water pumps 15 and water turbines 14 are used, i.e. three circulating water pumps 15-1, 15-2 and 15-3 are started up. In this situation, opens the stop valves 11-1 and 11-2 and the control valves 12-1, 12-2, 13-1 and 13-2 on the six branch pipes to make the cooling water enter into the three inner water chambers simultaneously, controls the water turbines 14-1, 14-2 and 14-3 to adjust the pressure of the main pipes in the cooling water inlet pipeline M so as to make the pressure of the upper outer water chamber 9 keep within a better range for film forming. The pressure of upper and lower cavities 10-1 and 10-2 of the lower outer water chamber is controlled by adjusting the opening of the control valves 12-1, 12-2, 13-1 and 13-2 to keep the water pressure of the water chamber in a proper range and assure the film forming effect of nozzles 1 at each row. Simultaneously, controls the control valves 13-1 and 13-2 to make the cooling water flow is 5% of the total amount of cooling water entered into the air-cooling zone 6 so as to achieve a better secondary condensation.

Under the working condition that the cooling water flow entered into the pipelines of the condenser is 75% of the circulating water flow, only two sets of circulating water pumps 15 and water turbines 14 are used, i.e. the circulating reduction water pumps 15-1 and 15-2 are started up, and the circulating water pump 15-3 is shut down. The flow and pressure of the upper outer water chamber 9 and the lower cavity 10-2 of the lower outer water chamber are controlled by the flow control elements. Specifically, the water turbines 14-1 and 14-2 are adjusted to control the pressure of cooling water in the cooling water inlet pipeline M, control valves 12-1 and 12-2 are closed, the stop valves 11-1 and 11-2 and control valves 13-1 and 13-2 are opened to make all the cooling water sprayed out from nozzles 1-3, 1-4, 1-5 and 1-6 of the upper inner water chamber so as to make the differential pressure of the nozzle 1 keep in a better condition for water film forming. In addition, the opening of the control valves 13-1 and 13-2 are controlled, and the cooling water flow entering into the air-cooling zone 6 is 5% of the total amount of cooling water entered into the condenser so as to ensure that the remaining steam in the secondary condensate chamber can be cooled further.

Under the working condition that the cooling water flow entering into the pipelines of the condenser is 40% of rated circulating water flow, only one set of circulating water pump 15 and water turbine 14 are used, i.e., the circulating water pump 15-1 is started up and the circulating water pumps 15-2 and 15-3 are shut down. The flow and pressure of the upper cavity 10-1 of the lower outer water chamber and the lower cavity 10-2 of the lower outer water chamber are controlled by the flow control elements. Specifically, the water turbine 14-1 is adjusted to control the cooling pressure in the cooling water inlet pipeline M, the stop valves 11-1 and 11-2 are closed, the control valves 12-1 and 12-2 and control valves 13-1 and 13-2 are opened to make all the cooling water sprayed out from nozzles 1-1 and 1-2 of the upper cavity 10-1 of lower outer water chamber so as to make the differential pressure of the nozzle 1 keep in a better condition for water film forming. In addition, the opening of the control valves 13-1 and 13-2 are controlled, and the cooling water flow entered into the air-cooling zone 6 is 5% of the total amount of cooling water entering into the condenser so as to ensure the remaining steam in the secondary condensate chamber can be cooled further.

Here only lists examples of controlling the cooling water flow by the startup quantity of the circulating water pumps, as well as three systems. The control of the cooling water flow can also be implemented by choosing the running speed of the circulating water pumps, adjusting the angle of the blades in the axial flow pump, or regulating the opening of the outlet valve on the water pump with the same principles, so the details of the controlling are not mentioned herein one by one.

The invention claimed is:

1. A jet type condenser, comprising:
a shell;
a plurality of inner water chambers being arranged in the shell;
a plurality of outer water chambers, each outer water chamber being correspondingly in communication with one of the plurality of inner water chambers and being arranged outside of the shell, each of the outer water chambers being in communication with a water source;
the plurality of inner water chambers comprising a lower inner water chamber having a transverse partition board disposed therein and configured to divide the lower inner water chamber into an upper cavity and a lower cavity, the lower and upper cavity being independent from each other;
a plurality of water cooling nozzles, each water cooling nozzle in fluid communication with at least one of the plurality of inner water chambers, the lower cavity not in direct fluid communication with any of the water cooling nozzles;
an air-cooling area, the air-cooling area being arranged below the lower inner water chamber; and
a water guiding tube in communication with the air-cooling area and the lower cavity of the lower inner water chamber such that a supply of water to the air-cooling area is independent of a supply of water to the plurality of water cooling nozzles;
wherein an outer water chamber of the plurality of outer water chambers corresponding to the lower inner water chamber is divided into two independent cavities, each cavity being in communication with one of the lower cavity and the upper cavity and each cavity in communication with the water source.

2. The jet type condenser according to claim 1 further comprising a plurality of pipes, each pipe connecting one of the plurality of outer water chambers with the water source, each pipe having a valve provided thereon.

3. The jet type condenser according to claim 1 wherein subsets of the water cooling nozzles are positioned on each of the plurality of inner water chambers, including the upper cavity of the lower inner water but excluding the lower cavity of the lower inner water chamber.

4. The jet type condenser according to claim 2, wherein at least one valve is closed and the other valves are adjusted to make a hydraulic pressure in each of the plurality of inner water chambers meet a pressure requirement for a spraying film of a nozzle associated with the jet type condenser when the cooling water is below design conditions.

5. The jet type condenser according to claim 4, wherein the valve at the pipeline connecting the lower cavity of the outer water chamber of the bottom layer to the water source is normally open, by adjusting the opening of the valve, so that the cooling water entering into the lower cavity of the outer water chamber of the bottom layer is controlled to be 5% of the total cooling water entering into the jet type condenser.

6. A cooling water system comprising:
a jet type condenser comprising:
a shell;
a plurality of inner water chambers being arranged in the shell;
a plurality of outer water chambers, each outer water chamber being correspondingly in communication with one of the plurality of inner water chambers and being arranged outside of the shell, each of the outer water chambers being in communication with a water source;
the plurality of inner water chambers comprising a lower inner water chamber having a transverse partition board disposed therein and configured to divide the lower inner water chamber into an upper cavity and a lower cavity, the lower and upper cavity being independent from each other;

a plurality of water cooling nozzles, each water cooling nozzle in fluid communication with at least one of the plurality of inner water chambers, the lower cavity not in direct fluid communication with any of the water cooling nozzles;

an air-cooling area, the air-cooling area being arranged below the lower inner water chamber; and a water guiding tube in communication with the air-cooling area and the lower cavity of the lower inner water chamber such that a supply of water to the air-cooling area is independent of a supply of water to the plurality of water cooling nozzles;

wherein an outer water chamber of the plurality of outer water chambers corresponding to the lower inner water chamber is divided into two independent cavities, each cavity being in communication with one of the lower cavity and the upper cavity and each cavity in communication with the water source; and power equipment; and a cooling tower;

the cooling tower, power equipment, and jet type condenser connected in sequence through pipelines, the pipelines entering the jet type condenser being divided into several parallel branches, each branch connecting to one of the plurality of outer water chambers.

7. The jet type condenser according to claim 6, wherein the power equipment comprises a water circulating pump and a hydraulic turbine, the water circulating pump is provided on the pipeline between the jet type condenser and the cooling tower for delivering circulating water to the cooling tower, the hydraulic turbine is provided on the pipeline between the cooling tower and the jet type condenser for doing work to generate energy through the flowing cooling water and supplying the energy to the water circulating pump.

* * * * *